United States Patent [19]

Kilpatrick et al.

[11] Patent Number: 5,203,712
[45] Date of Patent: Apr. 20, 1993

[54] CIRCUIT WIRING DEVICE

[75] Inventors: Jerry B. Kilpatrick, Greensboro; Mitchell E. Miller, Clemmons; Victor E. Slack, Lewisville, all of N.C.

[73] Assignee: AMP Incorporated, Harrisburg, Pa.

[21] Appl. No.: 822,246

[22] Filed: Jan. 17, 1992

[51] Int. Cl.$^5$ .............................. H01R 4/60
[52] U.S. Cl. ........................ 439/215; 439/211
[58] Field of Search ................... 439/209–211, 439/215, 216

[56] References Cited

U.S. PATENT DOCUMENTS

| | | | |
|---|---|---|---|
| 4,060,294 | 11/1977 | Haworth et al. | 339/4 |
| 4,278,834 | 7/1981 | Boundy | 439/209 X |
| 4,740,167 | 4/1988 | Millhimes et al. | 439/92 |
| 4,781,609 | 11/1988 | Wilson et al. | 439/210 X |
| 5,015,203 | 5/1991 | Furrow | 439/535 |
| 5,092,787 | 3/1992 | Wise et al. | 439/211 X |

OTHER PUBLICATIONS

AMP Catalog 89-867, issued Dec. 1989, Harrisburg, PA.

*Primary Examiner*—Eugene F. Desmond

[57] ABSTRACT

A power distribution system (2) for a raceway (6) of a wall panel comprises an outlet (8), a cable assembly (10), a junction box (12), a side-mount wiring device (14), and an end-mount wiring device (16) for connection to the junction box (12) as a self contained wiring branch adding an additional outlet receptacle (8).

13 Claims, 8 Drawing Sheets

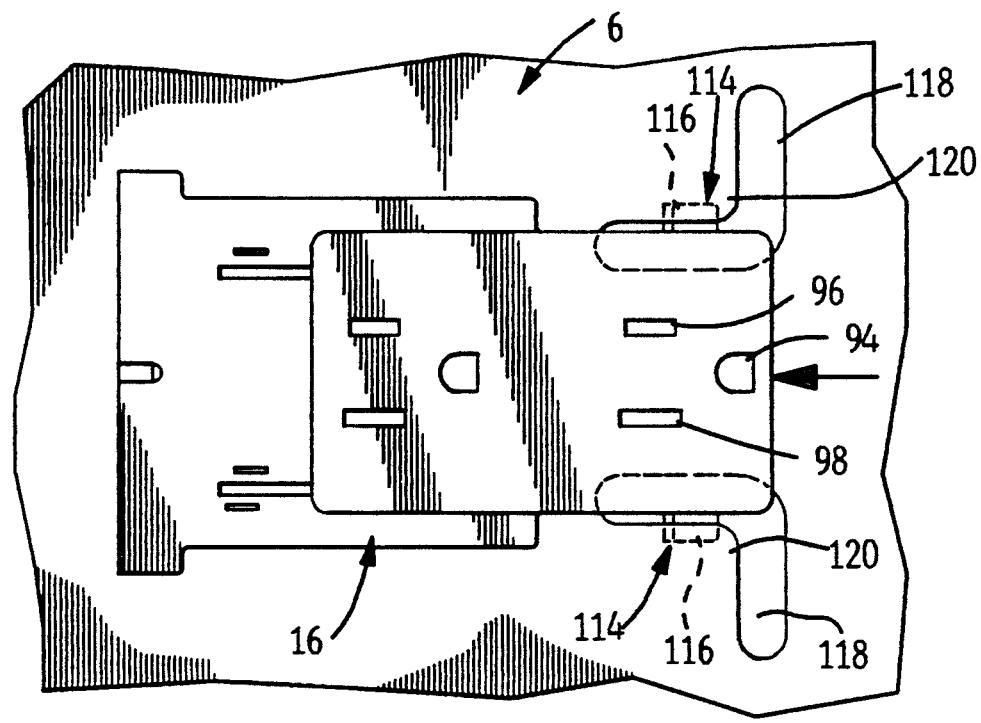
_Fig. 8_
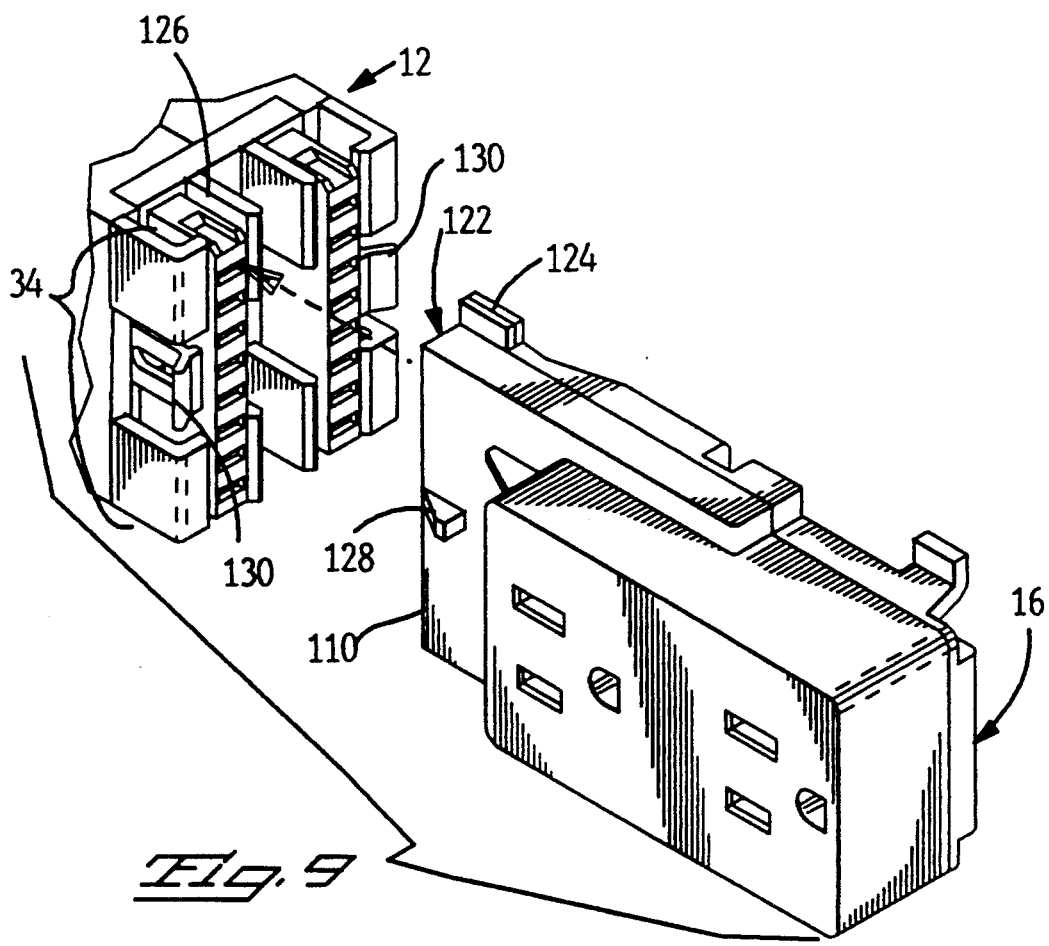
_Fig. 9_

5,203,712

CIRCUIT WIRING DEVICE

FIELD OF THE INVENTION

The invention relates to a power distribution system for a wall panel, and, more particularly, to a grounded circuit wiring device for connection onto a junction box to add an increased number of outlet receptacles in a power distribution system for a wall panel.

BACKGROUND OF THE INVENTION

A power distribution system for a wall panel is disclosed in U.S. Pat. No. 5,015,203, and comprises, a junction box that is installed in a raceway of a wall panel, two electrical outlets that plug into the junction box to provide outlet receptacles, and electrical cable assemblies of either five wires or eight wires that are terminated at their first ends to electrical connectors that plug into the junction box, the cable assemblies being adapted to extend along a raceway of the wall panel for use in connecting together multiple junction boxes in raceways of multiple wall panels, thereby to provide a power distribution system for the panels.

When it is desired to increase the number of outlet receptacles in a raceway of a wall panel, the usual practice is to add another junction box to the raceway, and then to add additional branch wiring to connect the added junction box to the power distribution system existing in the raceway. Then, additional outlet receptacles can be added to the junction box. What results is that the added junction box requires additional wiring. A demand now exists for adding an outlet receptacle to a raceway of a wall panel without the expense and labor associated with installation of an additional junction box and its additional wiring.

SUMMARY OF THE INVENTION

The invention provides an wiring device for direct connection to a junction box for adding outlet receptacles without a need for an additional wiring branch for adding the outlet receptacles.

The invention further provides a circuit wiring device secured to a raceway of a wall panel and a junction box mounted to the raceway, as well as adding additional outlet receptacles without additional branch wiring.

According to the invention, a power distribution system for a raceway of a wall panel, comprises, a junction box mounted to a raceway and provided with multiple ports, electrical wiring adapted for connection to selected ports on an input side of the junction box and to selected ports on the output side of the junction box, a side mount circuit wiring device having outlet receptacles connected to a side of the junction box, and an end mount circuit wiring device having outlet receptacles and conductive contacts of the outlet receptacles adapted for connection directly to selected ones of said multiple ports, and a housing adapted for connection to the raceway.

The invention will now be described by way of example with reference to the drawings, in which;

BRIEF DESCRIPTION OF THE DRAWINGS

FIG. 8 is a front view of the end-mount wiring device shown in FIG. 6 and a panel cut away, emphasizing the positive retention feature; and FIG. 9 is an enlarged perspective view of the end-mount wiring device shown in FIG. 6 and the junction box shown in FIG. 4, emphasizing the latching and alignment features.

DETAILED DESCRIPTION OF THE INVENTION

Figure 1:
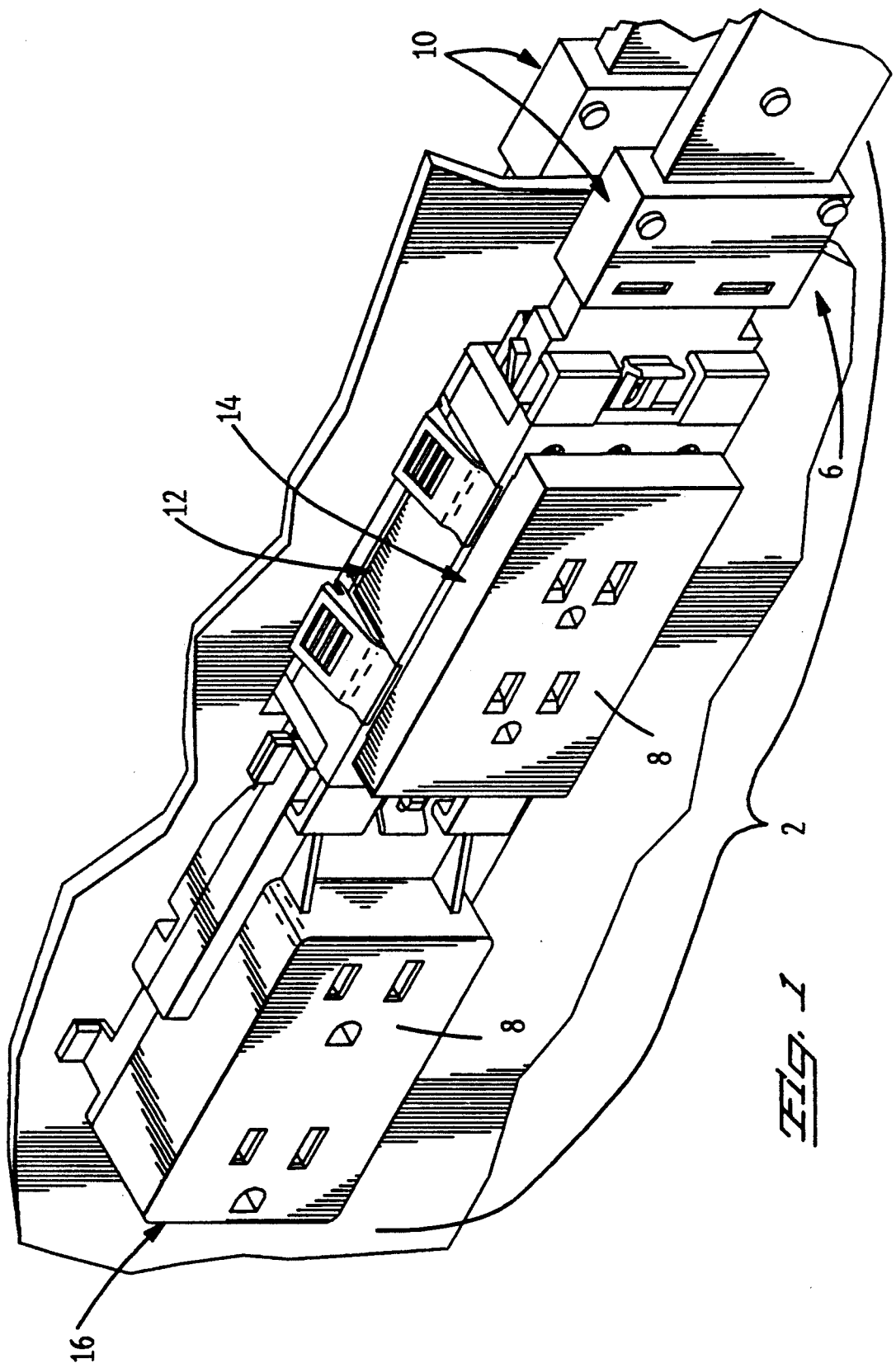
FIG. 1 is a perspective view of a power distribution unit for providing grounded AC power from a source through a modular panel to a receptacle outlet.
Figure 2:
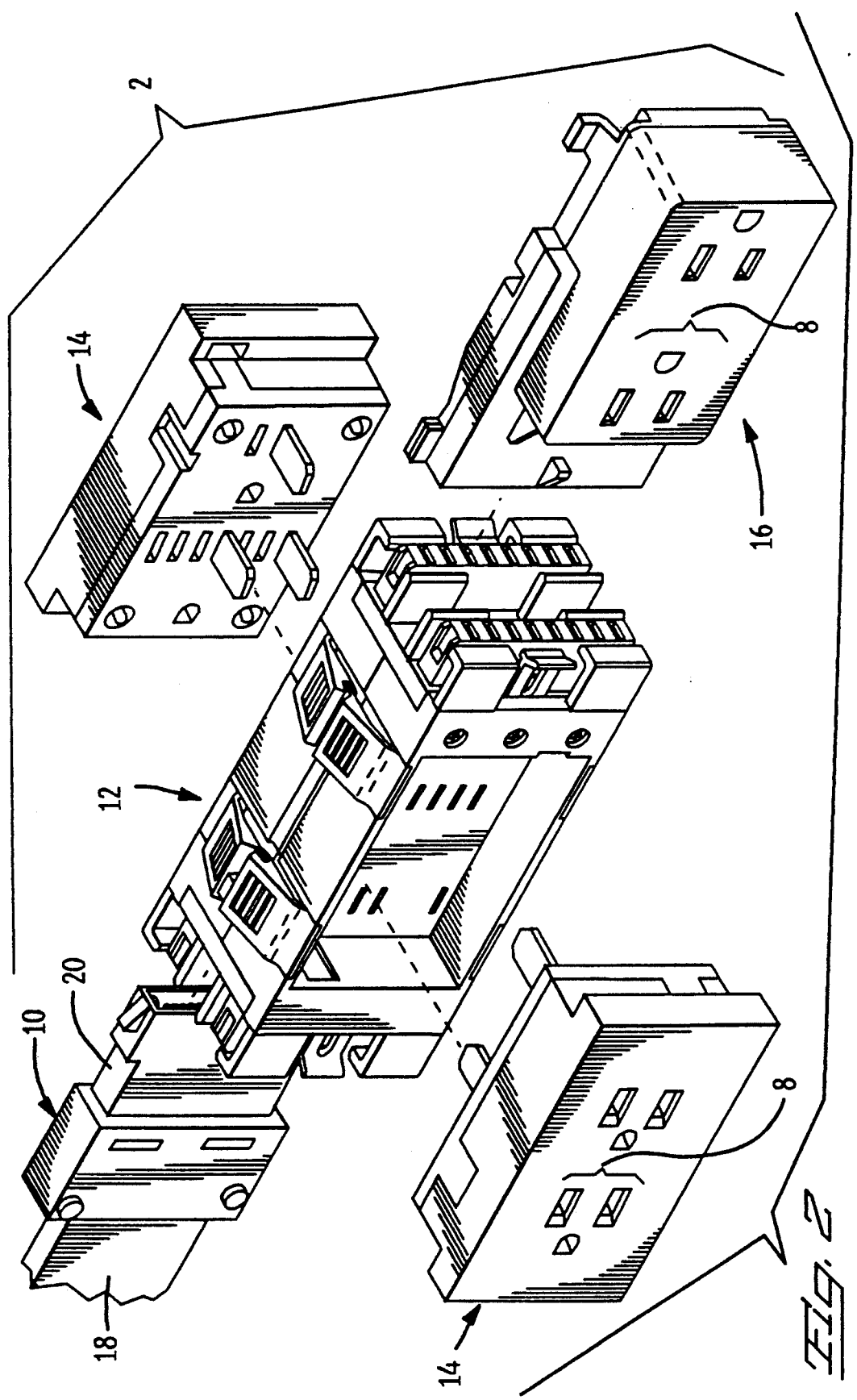
FIG. 2 is an exploded perspective view of the power distribution unit of FIG. 1 disassembled.

With reference now to FIG. 1, a power distribution system 2 for transmitting electrical power and ground along a raceway 6 of a wall panel, comprises a cable assembly 10, a junction box 12, a side-mount circuit wiring device 14 with outlet receptacles 8, also known as a duplex receptacle, and an end-mount circuit wiring device 16. Further details of the system 2 are described in U.S. Pat. No. 5,015,203.

Figure 3:
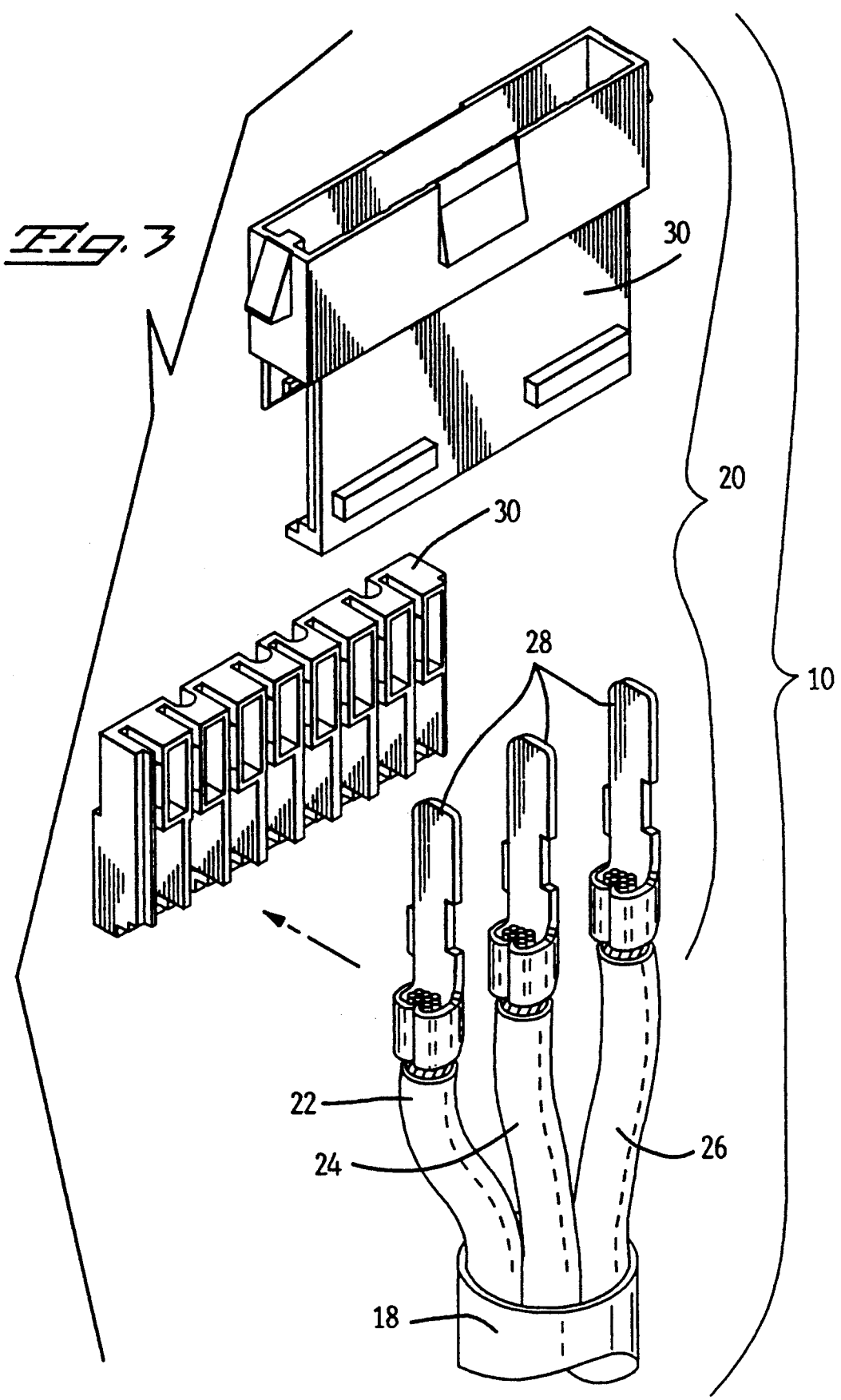
FIG. 3 is an exploded perspective view of the cable assembly of the power distribution unit shown in FIG. 1.

With reference to FIG. 3, the cable assembly 10 is adapted for pluggable connection with the junction box 12 and includes electrical wiring in a cable 18 for connecting the junction box 12 in the power distribution system 2 that extends through multiple wall panels, not shown. The junction box 12 is mounted to the raceway 6 in one of the panels 6. The cable assembly 10 includes a connector 20 adapted for direct connection to the junction box 12. The cable 18 is insulated and has at least three conductors, one ground 22, one hot 24, and one neutral 26. The connector 20 is adapted for electrical interconnection to the junction box 12 by having a plurality of terminals 28 that mateably engage with electrically contacting portions of the junction box 12. The connector 20 also includes a two-piece dielectric housing 30 adapted to hold the terminals 28 and to mate with an input port 32 of the junction box 12. Further details of the cable assembly are described in U.S. Pat. No. 5,026,304.

Figure 4:
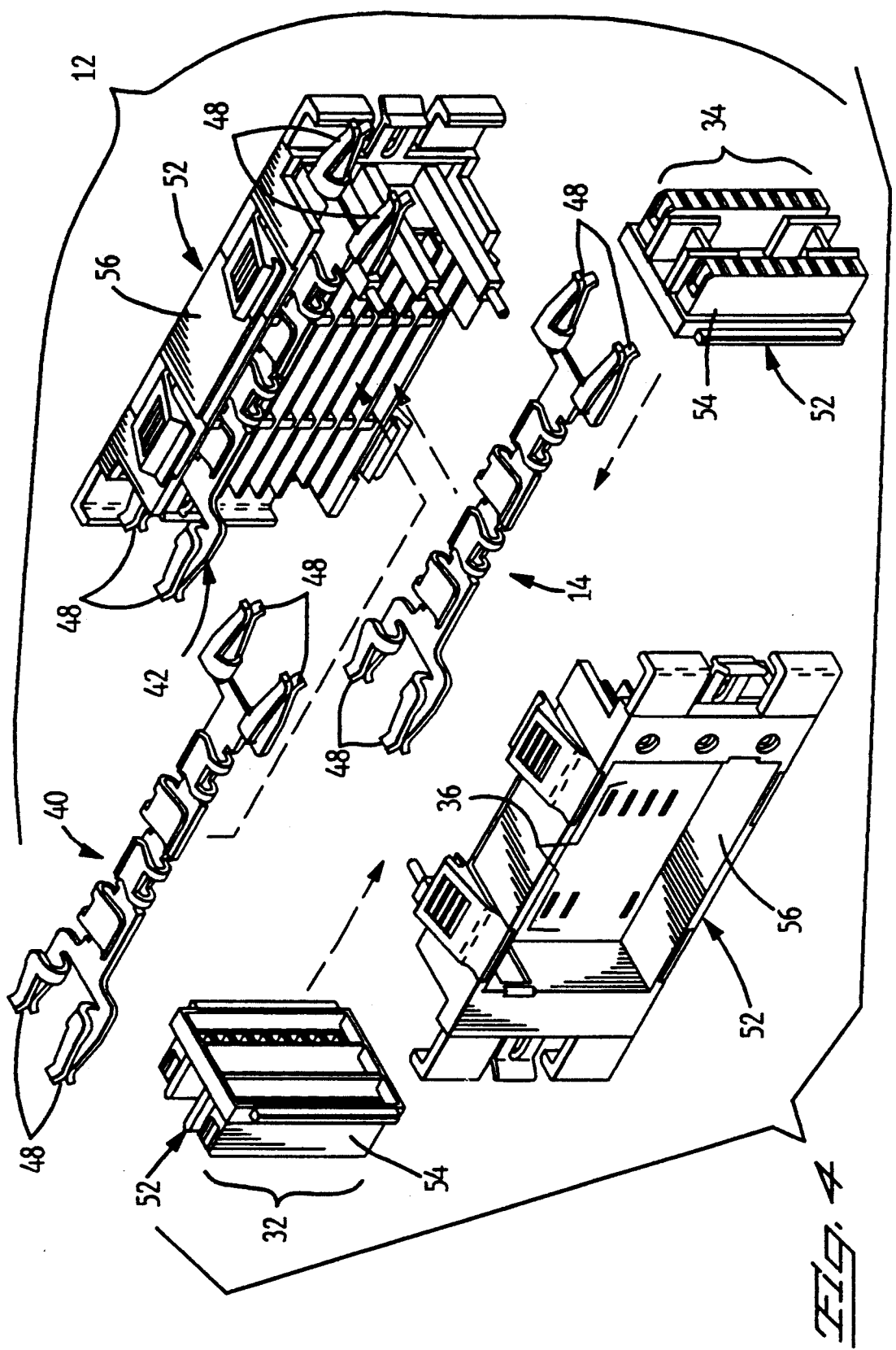
FIG. 4 is an exploded perspective view of the junction box of the power distribution unit shown in FIG. 1.

With reference to FIG. 4, the junction box 12 includes one input port 32 for connection to the cable assembly and preferably three output ports 34 adapted for connection to respective output cable assemblies 10, each output cable assembly 10 corresponding to a wiring branch. At least one of the output ports 34 is to be used for connection to the end-mount wiring device 16. Each port 32, 34 comprises at least three terminals 48 aligned on separate bus bars 40, 42, 44. Also, the junction box 12 includes at least one side-mount port 36 adapted for connection to the side-mount wiring device 14. The side-mount port 36 is composed of at least three terminals 50 aligned on bus bars 40, 42, 44.

The junction box 12 contains multiple bus bars including at least a ground bus bar 40, a hot bus bar 42, and a neutral bus bar 44, corresponding to the conductors 22, 24, 26 of the cable assembly 10. Each bus bar 40, 42, 44 provides a multiplicity of end-mount receptacle terminals 48 for power connection to the various components of the power distribution unit 2. One end-mount terminal 48 is for interconnecting with the connector 20 of the cable assembly 10 for power input. A second end-mount terminal 48 is for interconnecting with the end-mount wiring device 16, and two other terminals are available for other uses. The bus bars 40, 42, 44 are designed so that corresponding end-mount terminals 48 of the bus bars 40, 42, 44 are aligned in a row, facilitating connection to the various components.

In addition, the bus bars 40, 42, 44 of the junction box 12 are identical and comprise one, preferably four, side-mount receptacle terminals 50 for interconnecting with the side-mount wiring device 14. Of four side-mount receptacle terminals 50 on each bus bar 40, 42, 44, two will face in one direction and the other two will face in an opposite direction.

The junction box 12 also includes a dielectric housing 52 adapted to hold the bus bars 40, 42, 44 and to receive electrical contacting portions of the various components for interconnection. The housing 52 of the junction box 12 comprises two end caps 54 and two face plates 56, and is designed to accommodate bus bars 40, 42, 44 in various locations. The face plates 56 are adapted to receive electrical contacting portions of the side-mount wiring device 14 and have openings corresponding to the various side-mount terminals 50 of the bus bars 40, 42, 44. Each bus bar 40, 42, 44 is loaded into one face plate 56 as shown in FIG. 4. The other face plate 56 is added to cover the bus bars 40, 42, 44. The end caps 54 are then added to complete the junction box 12.

Having more than three positions for the bus bars 40, 42, 44 permits the junction box 12 to receive connectors 20 with terminals 28 in various locations. For example, the housing 52 may be designed for eight conductors with the hot bus bar 42 being received in position eight, or alternatively, the hot bus bar 42 could be received at position seven. The housing 52 of a given junction box 12 may, however, be designed using only three of the eight available positions.

Multiple end-mount terminals 48 of the various bus bars 40, 42, 44, together with a respective housing portion of one end cap 54 of the junction box 12 may be collectively referred to as one input port 32 or one output port 34. A multiplicity of side-mount terminals 50 of the various bus bars 40, 42, 44, together with a respective housing portion of the face plate 56 of the junction box 12 may be collectively referred to as one side-mount port 36. Further details of the junction box 12 appears in U.S. Pat. No. 5,015,203.

Figure 5:
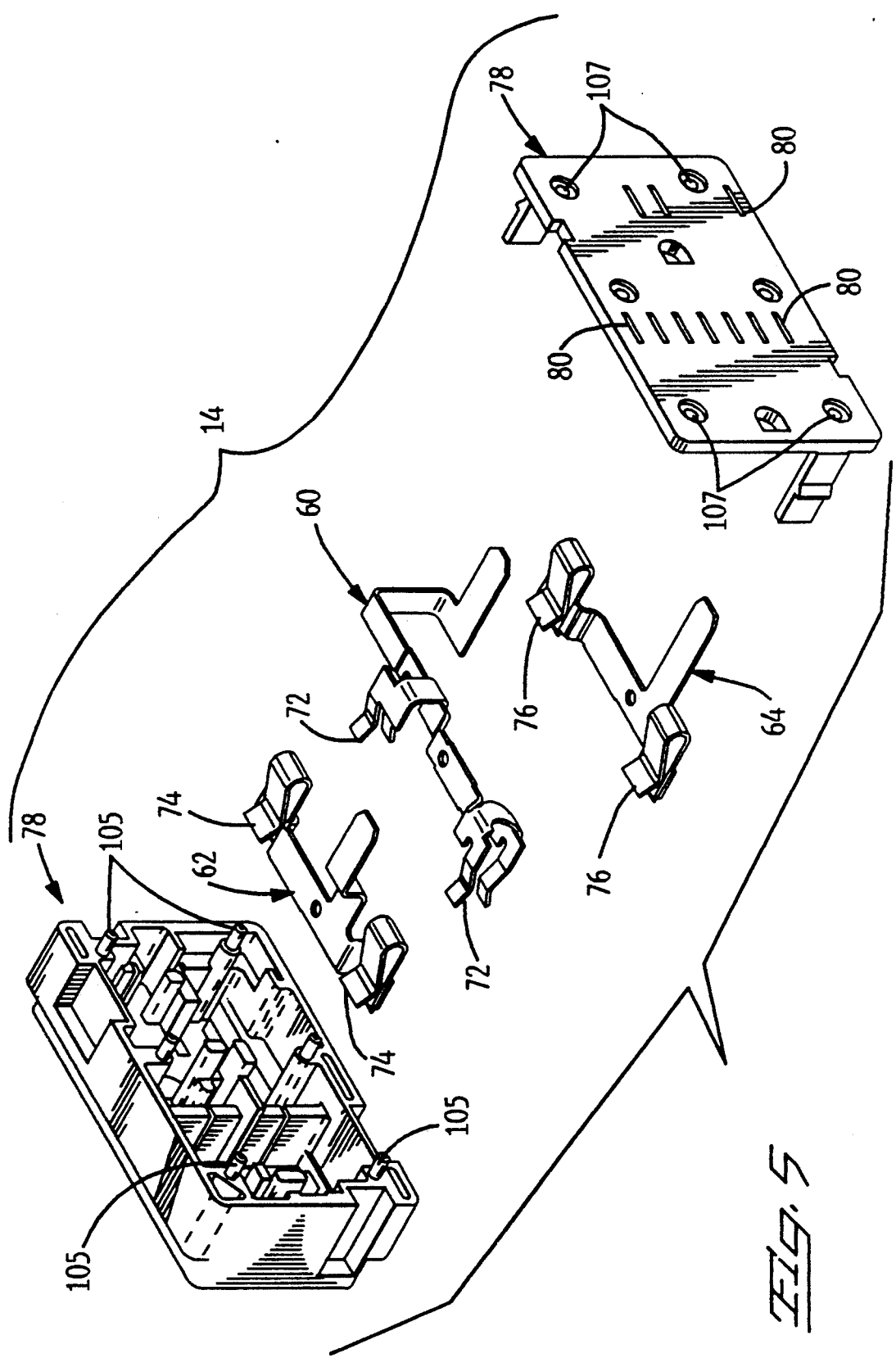
FIG. 5 is an exploded perspective view of a side-mount wiring device of the power distribution unit shown in FIG. 1.

With reference now to FIG. 5, the side-mount wiring device 14 is adapted for pluggable connection with the junction box 12 and contains a plurality of contacts including a ground contact 60, a hot contact 62, and a neutral contact 64, corresponding to the various bus bars 40, 42, 44 of the junction box 12. Each contact 60, 62, 64 includes a blade terminal 66, 68, 70 for interconnection to the side-mount terminal 50 of the corresponding bus bar 40, 42, 44 of the junction box 12. Each contact 60, 62, 64 also includes at least one receptacle terminal 72, 74, 76, preferably two, defining a receptacle outlet 8, preferably a duplex outlet, for interconnection to an electrical plug, not shown. The side-mount wiring device 14 also includes a two-piece dielectric housing 78 adapted to hold the contacts 60, 62, 64, to receive the blade terminals 66, 68, 70 through various openings 80 in one piece of the housing, and to receive terminals of the electrical plug, not shown. Further details of the side-mount wiring device 14 are described as a duplex receptacle in U.S. Pat. No. 4,740,167.

Figure 6:
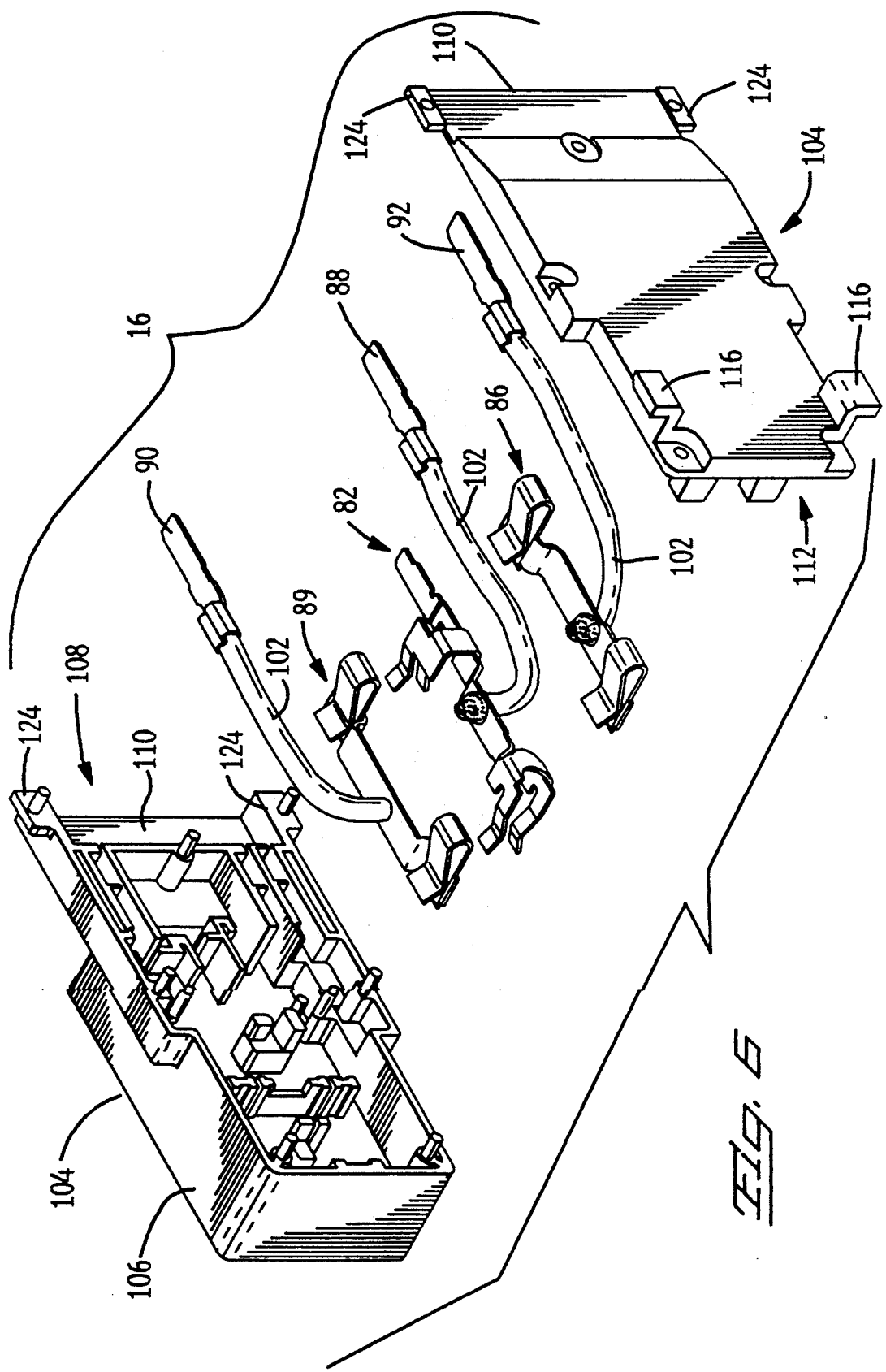
FIG. 6 is an exploded perspective view of an end-mount wiring device of the power distribution unit shown in FIG. 1.
Figure 7:
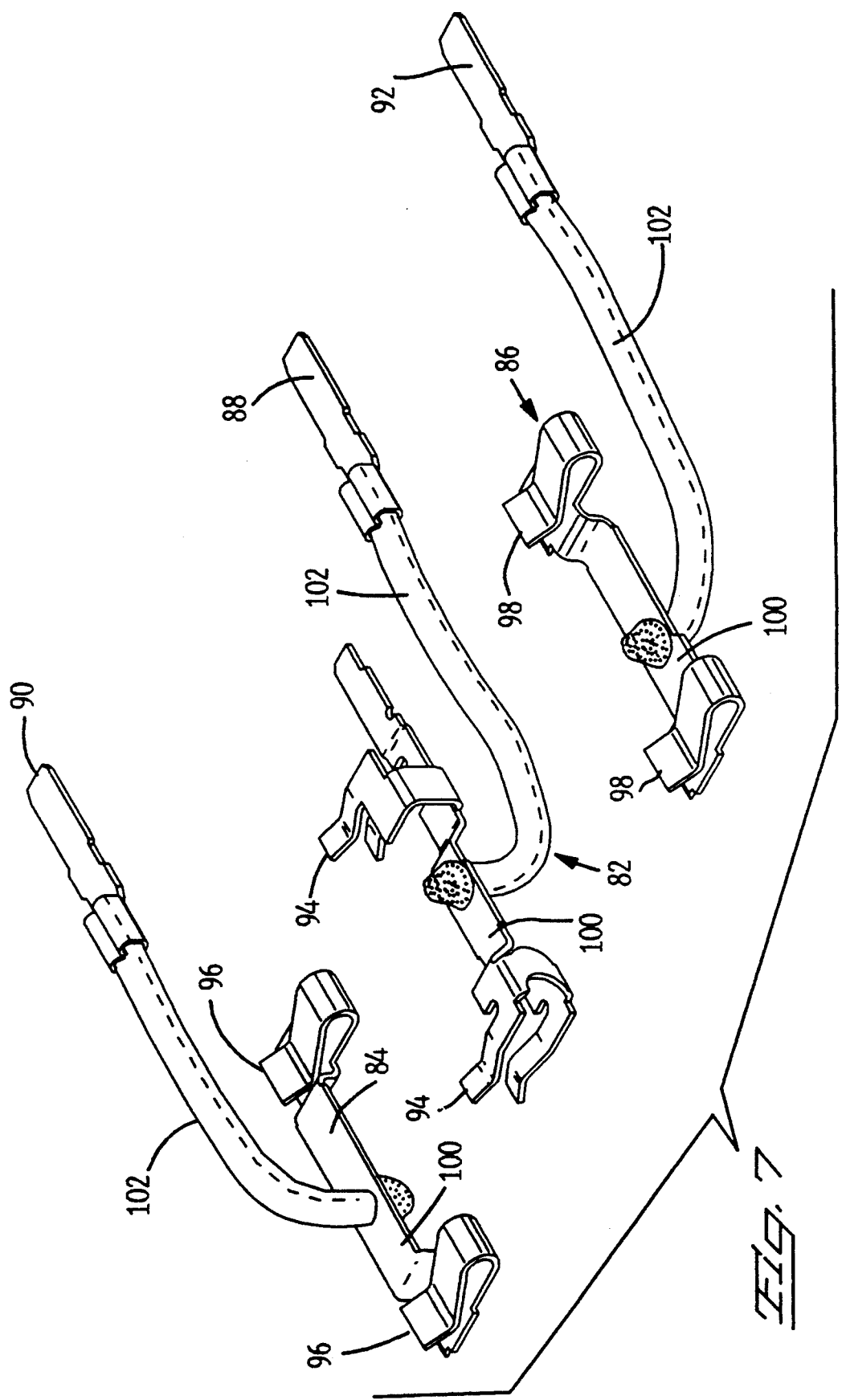
FIG. 7 is an enlarged perspective view of the contacts of the end-mount wiring device shown in FIG. 6.

With reference now to FIG. 6, the end-mount wiring device 16 is adapted for pluggable connection directly to the junction box 12 and contains a plurality of contacts including a ground contact 82, a hot contact 84, and a neutral contact 86, corresponding to the various bus bars 40, 42, 44 of the junction box 12. With reference now to FIG. 7, each contact 82, 84, 86 includes a blade terminal 88, 90, 92 for interconnection to the end-mount receptacle terminal 48 of the corresponding bus bar 40, 42, 44 of the junction box 12. Each contact 82, 84, 86 also includes at least one receptacle terminal 94, 96, 98, preferably two, defining an outlet receptacle 8, preferably a duplex outlet receptacle. The contacts 82, 84, 86, including the receptacle terminals 94, 96, 98, are stamped and formed from conductive metal. The contacts 82, 84, 86 each have a body 100 with which the receptacle terminals 94, 96, 98 are integral. The blade terminal 88, 90, 92 of each contact 82, 84, 86 may be integral, or connected to the body 100 by a wire 102. In a preferred embodiment, the wire 102 is soldered to the body 100 and the blade terminal 88, 90, 92 is secured by a crimp connection to the wire 102. In use, the blade terminal 88, 90, 92 will be at a right angle to the end-mount receptacle terminals 48 so that the blade terminals 88, 90, 92 will be interconnected with the end-mount terminals 48 of the junction box 12 and the receptacle terminals 94, 96, 98 will be available for receipt of an electrical plug, not shown.

With reference again to FIG. 6, the end-mount wiring device 16 further has a two-piece housing 104. The housing 104 is molded from dielectric material such as plastic, and is designed to hold the contacts 82, 84, 86 of the end-mount wiring device 16 in place in a body 106 of the housing 104. A front end 108 of the housing 104 forms a hood mating portion 110 adapted to hold and to cover the blade terminals 88, 90, 92 and to mate with one of the output ports 34 of the junction box 12.

The housing 104 has multiple mounting positions for the contacts 82, 84, 86, which locate the contacts 82, 84, 86 in positions corresponding to only three of the available positions for alternating the position of specific contacts 82, 84, 86, such as the hot contact 84. The housing 104 also has openings in a face to accommodate the electrical plug, not shown, which it receives. The two pieces of the housing 104 are attached via a pin 105 and hole 107 design, and are secured by staking each pin 105 after it has been inserted through the corresponding hole 107.

An important feature of the housing 104 of the end-mount wiring device 16 is the manner in which it may be secured to the panel raceway 6. It is known in the art to secure a duplex receptacle to the panel raceway 6 or to a junction box by means of a screw. As shown in FIG. 8, a rear end of the end-mount wiring device 16 has a positive retention feature 114 provided by two projecting rear tabs 116, one at an upper surface and one at a lower surface, for securing the wiring device to the panel raceway 6. The rear tabs 116 are adapted to slide into slots 118 of the panel raceway 6 which may be defined by offset tabs 120.

The positive retention feature 114 is designed to be useful when an electrical plug, not shown, is removed from the end-mount wiring device 16. The plug is pulled from the receptacle terminals 94, 96, 98 of the end-mount wiring device 16 away from the panel raceway 6, pulling the end-mount wiring device 16 away from the panel raceway 6, as well. A front surface of each rear tab 116 presses against the corresponding tab 120 of the panel raceway 6 to hold the end-mount wiring device 16 in place. The positive retention feature 114 is unnecessary for the side-mount wiring device 14 as it is not mounted directly on the panel raceway 6.

The end-mount wiring device 16 also has an alignment feature 122 which is adapted to align the wiring device 16 with the junction box 12. As shown in FIG. 9, the front end of the end-mount wiring device 16 has on the hood 110 two projecting front tabs 124, one at the upper surface and one at the lower surface, for aligning the wiring device 16 with the junction box 12. The front tabs 124 are adapted to slide into a slot 126 of the junction box 12 within the output port 34 of the junction box 12. This aligns the blade terminals 88, 90, 92 of the end-mount wiring device 16 with the end-mount terminals 48 of the respective output port 34 of the junction box 12. In addition, the hood 110 is relatively deformable when compared to the output port 34. This permits the end-mount wiring device 16 to compensate for small variations in pre-alignment prior to alignment using the alignment feature 122, while preventing misalignment of the respective terminals 88, 90, 92 of the wiring device with the respective terminals 48 of the junction box 12.

Also with reference to FIG. 9, the hood 110 of the end-mount wiring device 16 is used to secure the end-mount wiring device 16 to the junction box 12. The hood 110 has protruding latches 128 on a face thereof adapted to be received within an opening in a clip 130 of the junction box 12. The hood 110 is relatively deformable when compared to the output port to permit the latch 128 to be deflected by the clip 130 of the junction box 12. The latch 128 of the end-mount wiring device 16 then snaps into the opening of the clip 130 of the junction box 12 to secure the end-mount wiring device 16 to the junction box 12. The latching structure of the junction box 12 is discussed further in U.S. Pat. No. 5,015,203.

The power distribution system 2 is connected by first mating the connector 20 of the cable assembly 2 with the input port 32 of the junction box 12 by inserting the terminals 28 of the connector 20 of the cable assembly 10 into the end-mount receptacle terminals 48 of the bus bars 40, 42, 44 at the input port 32 of the junction box 12. The side-mount wiring device 14 is then mounted on the junction box 12 to provide the duplex receptacle outlet 8 by inserting the blade terminals 66, 68, 70 of the side-mount wiring device 14 through corresponding openings of the face plate 56 of the housing 52 of the junction box 12 into the corresponding side-mount receptacle terminals 50 of the bus bars 40, 42, 44 of the junction box 12. The end-mount wiring device 16 is mounted on the junction box 12 by mating the hood 110 with an output port 34 and inserting the blade terminals 88, 90, 92 of the end-mount wiring device 16 through corresponding openings of the face plate 56 of the housing 52 of the junction box 12 into the corresponding end-mount receptacle terminals 48 of the bus bars 40, 42, 44 at one output port 34 of the junction box 12. The end-mount wiring device 16 provides another duplex receptacle outlet 8. The power distribution system 2 thus provides four outlet receptacles 8 in a single wall panel.

An additional output cable assembly, not shown, may be connected to an output port of the junction box 12, for example, for connecting the power distribution system 2 to serve two output wiring branches, one wiring branch along straight panel walls, and another wiring branch along a wall panel that intersects the straight wall panels. The end-mount wiring device 16 substitutes for a separate wiring branch of the system that was heretofore required for adding outlet receptacles. The end-mount wiring device 16 connects with one of the output ports 34 of the junction box 12 and adds a receptacle outlet 8 to the system 2. The end-mount circuit wiring device 16 comprises a single component with a receptacle outlet 8, and is adapted for connection to the wiring system 2 at the junction box 12.

The end-mount wiring device 16 may also be added to an existing power distribution system 2. For example, a previously installed power distribution unit 2 could have an unused output port 34 on the junction box 12. The end-mount wiring device 16 may be plugged into the junction box 12 to provide a second receptacle outlet 8 in the panel raceway 6.

We claim:

1. A power distribution system for a raceway, comprising:

a junction box adapted to be connected to an input wiring cable, comprising, an insulative housing providing at least one outlet receptacle port adapted to receive a first outlet receptacle, multiple output wiring ports, first electrical terminals in said outlet receptacle port and second electrical terminals in each of said output wiring ports electrically connected, respectively, to the first electrical terminals in said outlet receptacle port;

multiple conductors of an input wiring cable electrically connected, respectively, with the first electrical terminals, whereby the input wring cable is electrically connected to the first electrical terminals of the outlet receptacle port;

multiple conductors of at least one output wiring cable electrically connected, respectively, to the second electrical terminals in a selected one of the output wiring ports, whereby the output wiring cable is electrically connected to the first electrical terminals in said outlet receptacle port;

a wiring device comprising, an insulative housing providing at least a second outlet receptacle and electrical contacts in the housing connected to said second outlet receptacle;

and said electrical contacts being mateably engaged with said second electrical terminals in a second one of the output wiring ports whereby the second outlet receptacle is electrically connected to the first electrical terminals in said outlet receptacle port.

2. A power distribution system as recited in claim 1, comprising:

each of the output wiring ports being adapted to connect to, either an output wiring cable, or said wiring device.

3. A power distribution system as recited in claim 1, comprising:

multiple conductors of a second output wiring cable electrically connected to said second contacts in a third one of said outlet wiring ports, whereby the first and second output wiring cables are electrically connected to the first electrical terminals in the outlet receptacle port.

4. A power distribution system as recited in claim 1, comprising:
the wiring device and the junction box having a tab and slot cooperatively engaged with each other when said electrical contacts are aligned for connection to the second electrical terminals of said second output wiring port.

5. A power distribution system as recited in claim 1, comprising:
the outlet receptacle port facing in a direction extending outwardly from a side of the junction box, and the second outlet receptacle facing in the same direction.

6. A power distribution system as recited in claim 1, comprising:
the housing of said wiring device latchably engaging the housing of the junction box, and projecting tabs on the housing of the wiring device adapted for insertion along tab receiving slots of a raceway.

7. A power distribution system as recited in claim 6, comprising:
the tabs are adapted to press against the raceway to hold the wiring device in place.

8. A power distribution system as recited in claim 1, comprising:
a deformable hood on the housing of said wiring device covering portions of the contacts, and latches on the deformable hood latchably engaging the housing of the junction box.

9. A power distribution system as recited in claim 8, comprising:
tabs on upper and lower surfaces of the wiring device adapted for insertion along tab receiving slots of a raceway, and the hood being on an end of the wiring device.

10. A power distribution system as recited in claim 9, comprising:
the tabs are adapted to press against the raceway to hold the wiring device in place.

11. A power distribution system as recited in claim 1, comprising:
an outlet receptacle having electrical contacts adapted for connection with the first electrical terminals in the outlet receptacle port.

12. A kit of parts for assembly in a power distribution system for a raceway, comprising:
a junction box adapted to connect to an input wiring cable, comprising, an insulative housing providing at least one outlet receptacle port adapted to receive a first outlet receptacle, multiple output wiring ports each adapted to connect electrically to multiple conductors of respective output wring cables, first electrical terminals in said outlet receptacle port and second electrical terminals in each of said output wiring ports adapted to connect electrically, respectively, to the first electrical terminals in said outlet receptacle port;
multiple conductors of an input wiring cable adapted to connect electrically, respectively, to the second electrical terminals, whereby the input wiring cable is electrically connected to the first electrical terminals in the outlet receptacle port;
multiple conductors of at least one output wiring cable adapted to connect electrically, respectively, to the second electrical terminals in a selected one of the output wiring ports, whereby the output wiring cable is electrically connected to the first electrical terminals in said outlet receptacle port;
a wiring device comprising, an insulative housing providing at least a second outlet receptacle and electrical contacts in the housing adapted to connect to said second outlet receptacle;
and said electrical contacts adapted to mateably engage with said second electrical terminals in a second one of the output wiring ports whereby the second outlet receptacle is electrically connected to the first electrical terminals in said outlet receptacle port.

13. A kit of parts as recited in claim 12, comprising:
an outlet receptacle having electrical contacts adapted to connect with the first electrical terminals in the outlet receptacle port.

* * * * *

UNITED STATES PATENT AND TRADEMARK OFFICE
CERTIFICATE OF CORRECTION

PATENT NO. : 5,203,712
DATED : April 20, 1993
INVENTOR(S) : Jerry B. Kilpatrick et al.

It is certified that error appears in the above-indentified patent and that said Letters Patent is hereby corrected as shown below:

Claim 1 - Column 6, line 39 "wring" should be --wiring--

Claim 12, Column 8, Line 13 "wring" should be --wiring--

Signed and Sealed this

Thirtieth Day of August, 1994

Attest:

BRUCE LEHMAN

Attesting Officer

Commissioner of Patents and Trademarks